Dec. 2, 1930.  W. J. DE WITT  1,783,915
PROCESS OF AND APPARATUS FOR MOLDING HOLLOW LASTS
Filed Feb. 7, 1927  5 Sheets-Sheet 1

Fig.1

Inventor:
William J. DeWitt,
by Roberts Cushman & Woodberry
Attys.

Patented Dec. 2, 1930

1,783,915

UNITED STATES PATENT OFFICE

WILLIAM J. DE WITT, OF AUBURN, NEW YORK, ASSIGNOR TO SHOE FORM CO., INC., OF AUBURN, NEW YORK, A CORPORATION OF NEW YORK

PROCESS OF AND APPARATUS FOR MOLDING HOLLOW LASTS

Application filed February 7, 1927. Serial No. 166,315.

This invention pertains to a process of and apparatus for making shoe forms or hollow lasts from normally stiff sheet material, for example, celluloid, and constitutes an improvement upon the process and apparatus disclosed in my Patent No. 1,585,284, dated May 18, 1926.

The process described in my aforesaid patent is highly useful and results in the production of substantially perfect and commercially acceptable forms or lasts, while the apparatus disclosed in said patent is also of a practical character, but as the result of further experiment I have so improved my prior process and apparatus as to enable me to produce forms or lasts more rapidly and with less consumption of heat than formerly and by the employment of relatively unskilled and cheap labor. I thus speed up production and lessen the cost thereof which is of great importance from the commercial standpoint, since the shoe trade demands that orders for such forms or lasts be filled with the utmost expedition, and the competition in this industry is extremely keen.

In the accompanying drawings I have illustrated by way of example a preferred apparatus useful in the practice of my improved process, and in the drawings.

Figures 4, 11, 12, 13, 14:
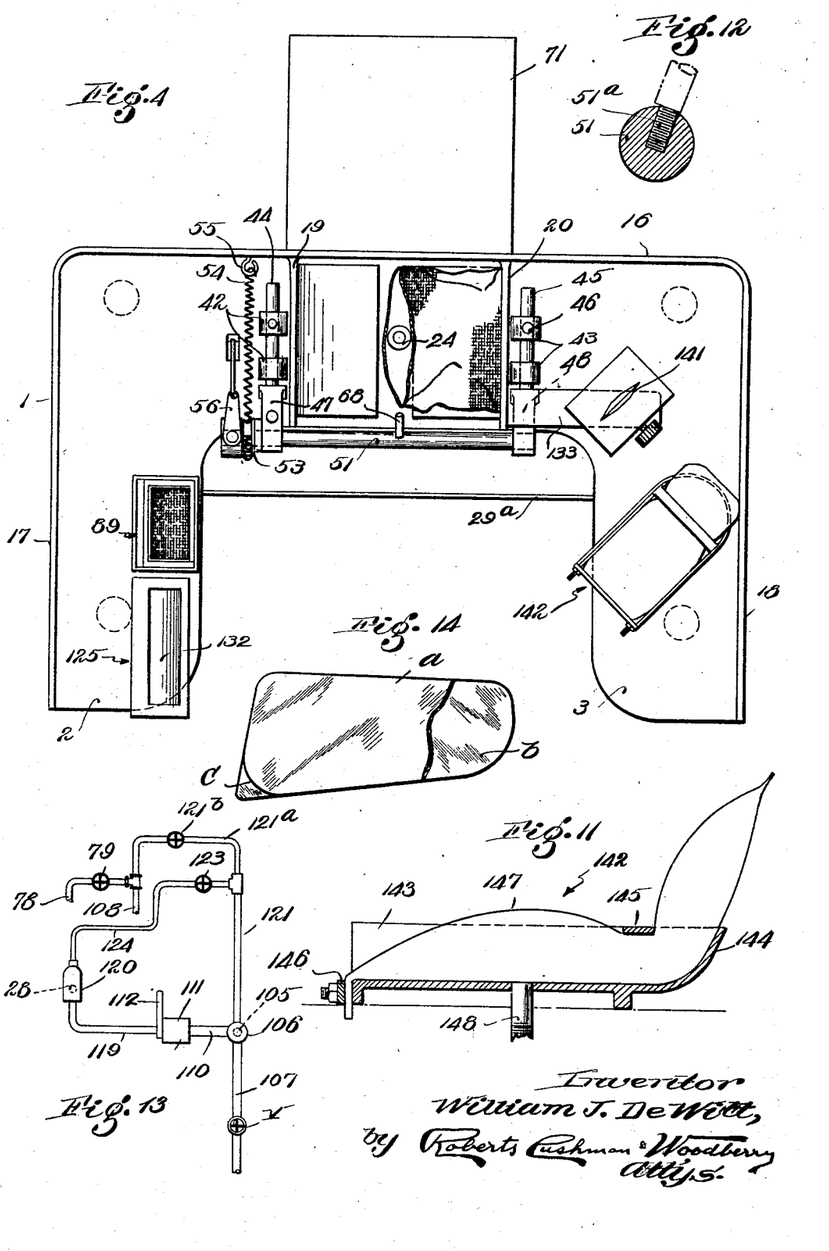
Fig. 4 is a plan view of the machine as shown in Fig. 1 but omitting the hood and certain other parts.
Fig. 11 is a vertical section showing details of a device for cooling and setting the foreparts of the lasts after molding.
Fig. 12 is a transverse vertical section, to larger scale, through the last-supporting shaft, substantially on the line 3—3 of Fig. 1.
Fig. 13 is a diagrammatic rear view of the pipe connections at the back side of the machine.
Fig. 14 is a plan view, partly broken away, showing a cross bar used for bracing the hollow form or last.
Figure 5:
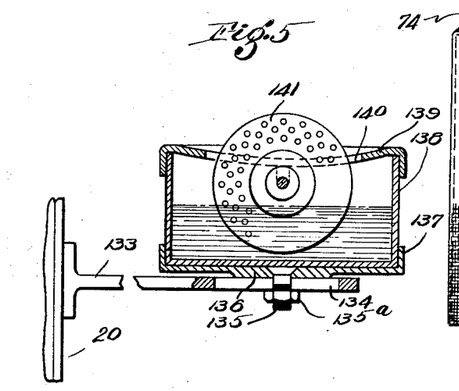
Fig. 5 is a fragmentary vertical section, to larger scale, showing a device for applying attaching solution to the ends of the cross bars of the last.

My improved apparatus preferably comprises a substantially horizontal table of more or less U-shape as illustrated in Fig. 4, having the central rear portion 1 and the forwardly directed wings 2 and 3 disposed at either side of the machine and between which the operator may stand. The table may conveniently be made as a unitary casting, although this is not essential, and I preferably provide bosses 4 and 5 (Fig. 1) projecting downwardly near the ends of the wings 2 and 3, respectively, the bosses being hollow and providing sockets, screw threaded if desired, for the reception of the upper ends of the front legs 6 and 7, respectively. The legs 6 and 7 are furnished with feet 8 and 9 respectively at their lower ends. Preferably these feet are of tripod shape to provide an extended bearing and stable support for the legs.

I also furnish bosses 10 and 11 at the rear part of the table and these bosses are provided with socket openings, which may be screw threaded as desired, for the reception of the upper ends of the legs 12 and 13, respectively. These legs are furnished with feet 14 and 15 respectively at their lower ends and like the front feet, these rear feet are preferably of tripod shape and of sufficient area to provide a stable support for the machine. Preferably the front and rear legs are formed of ordinary pipe of suitable size, thus reducing the cost of construction. Obviously, if desired, the several legs might be formed in other ways, for example, as castings attached in any desired manner to the table top.

Figure 2:
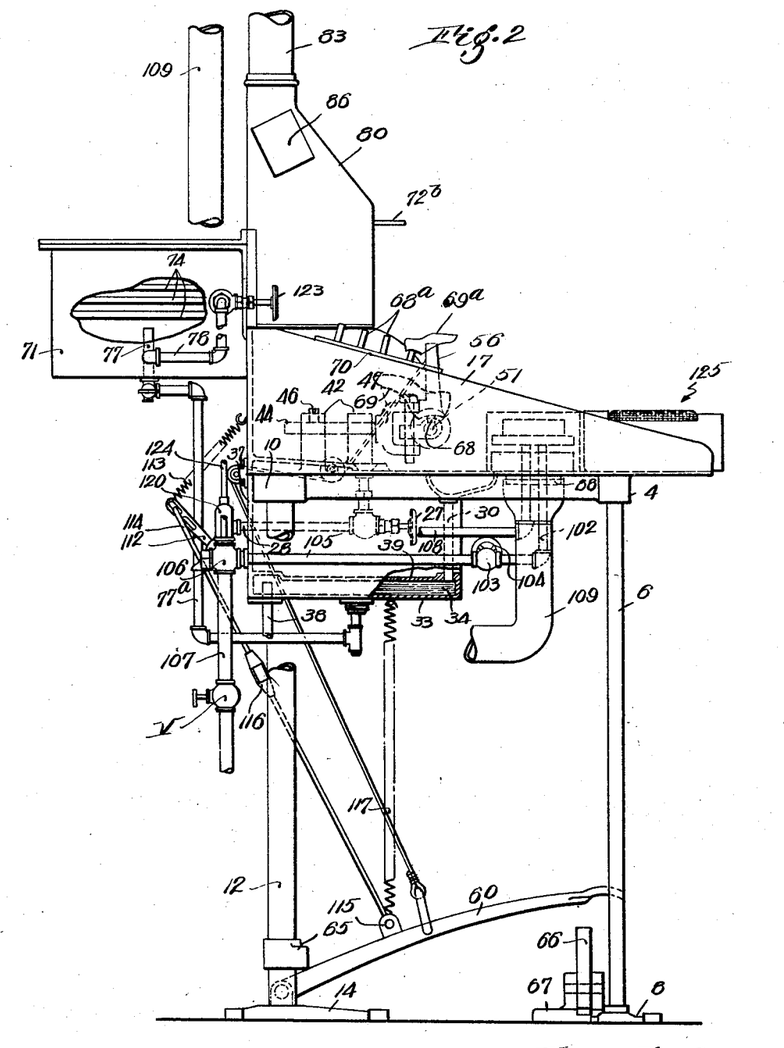
Fig. 2 is a side elevation with parts broken away and certain parts in section, viewed from the left-hand side of Fig. 1, the parts being in the same position as shown in Fig. 1.
Figure 3:
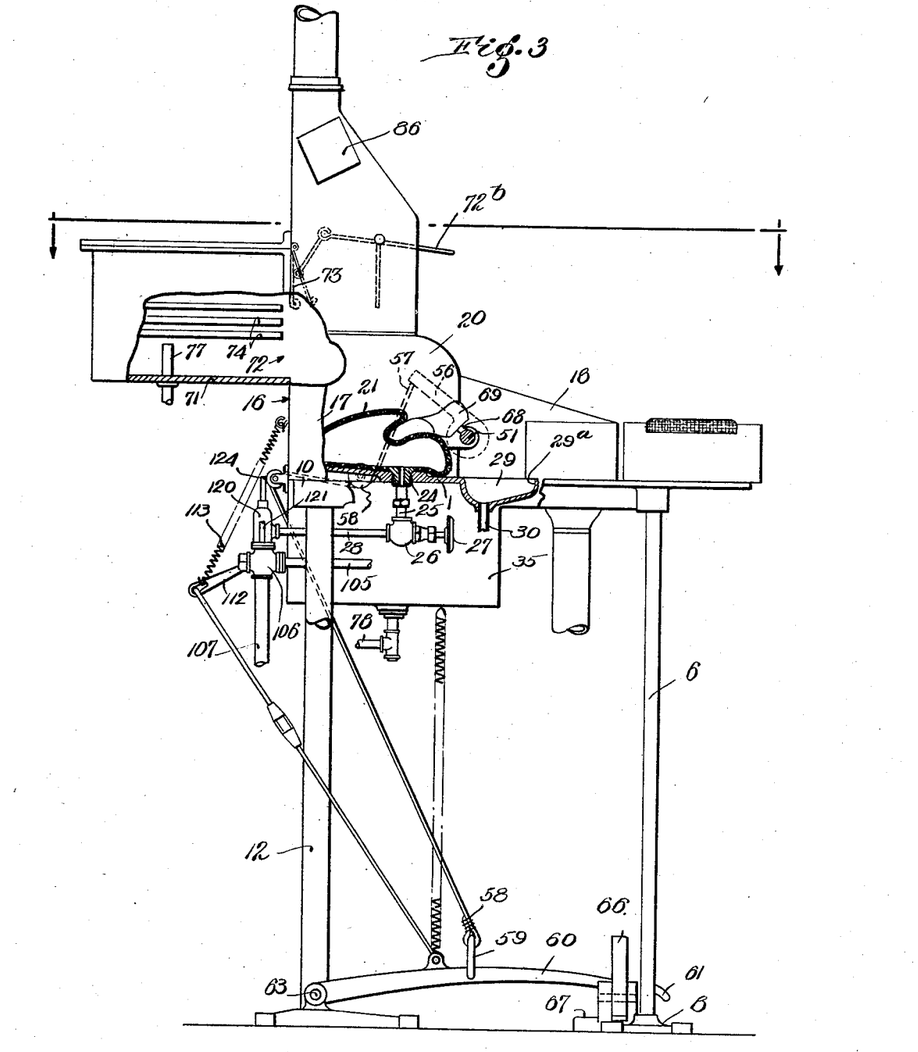
Fig. 3 is a view generally similar to Fig. 2, omitting many of the parts and showing some parts in section on the line 3—3 of Fig. 1, the parts being shown in the position which they occupy during the molding operation.

I provide the rear edge of the table with a substantially vertical back member or wall 16, and I also provide vertical side walls 17 and 18 extending along the outer edges of the wings 2 and 3 respectively. As indicated in Figs. 2 and 3, these side walls 17 and 18 may taper in vertical height from the point of their connection to the rear wall 16 to their forward ends.

The central part 1 of the table is provided with spaced substantially vertical guard walls 19 and 20 extending forwardly from the back wall 16 to which they may be integrally united, if desired. These guard walls are spaced apart a sufficient distance to provide a chamber between them for the reception of the inflatable pillow or cushion 21, which forms one of the molding instrumentalities, as described in my patent above referred to. In the present arrangement this pillow is preferably substantially rectangular and rests in a downwardly concave cradle formed by a pair of curved plates 22 and 23 whose upper edges rest against and may, if desired, be connected to the guard walls 19 and 20 respectively, and whose lower edges rest upon the upper surface of the table member 1. These cradle members 22 and 23 are substantially rigid and form a support for the pillow and by reason of their concave shape determine to some extent at least the shape of the pillow when the latter is inflated.

The table is provided with an opening immediately beneath the pillow or cushion 21 and the cushion is furnished with a nipple 24 (Fig. 3) projecting downwardly through this opening and connected by means of a pipe 25 to a valve 26 having an operating handle 27. The inlet of the valve 26 is connected to a pipe 28 leading to steam-supplying means as hereinafter described.

Just forward of the cushion or pillow 21 the central part 1 of the table is furnished with a trough-like depression 29 (Figs. 1 and 3) having the flange 29ª at its forward edge. A drain pipe 30 leads from the bottom of this trough-like depression 29, and preferably this drain pipe is provided with a strainer, not shown, to prevent tacks, dirt, or other material from passing down into the pipe 30.

The rear legs 12 and 13 are provided respectively with supporting brackets 31 and 32 (Fig. 1) which carry the warming shelf 33 (Figs. 1 and 2) disposed in a plane substantially below that of the table top. This warming shelf 33 is hollow, being formed in any desired manner, as, for example, a unitary casting of sheet material pressed into shape, and has the interior chamber or reservoir 34 (Fig. 2) for the reception of hot water. The pipe 30 from trough 29 discharges into this reservoir.

Preferably, I provide the warming shelf 33 with side walls 35 and 36 and a rear wall 37, which extend up to the under side of the table top to which they may be attached, if desired. If these walls 35, 36 and 37 are securely attached to the table top the brackets 31 and 32 may be omitted.

A drain pipe 38 (Fig. 2) projects upwardly into the chamber 34 to such a distance as to determine the desired water level within said chamber. The upper surface 39 of the warming shelf 33 furnishes a support upon which I place a reserve supply of forepart blanks which are subsequently to be molded. The hot water within the chamber 34 keeps the shelf surface 39 warm and as the sides, rear, and top of the space above the shelf 33 are closed, the heat of the water within the hollow shelf keeps the air in the space above the shelf sufficiently warm at all times to heat the blanks piled on the shelf and thus to render them somewhat more pliable than when cold. I have indicated two piles of blanks 40 and 41 respectively, which may be considered to be right and left blanks, and from these piles the operator withdraws blanks from time to time as hereafter described and replaces them with new and cool blanks.

On some convenient part of the supporting structure, for example upon the outer surfaces of the guard walls 19 and 20, I arrange supporting brackets 42 and 43 respectively, having aligned openings for the reception of substantially horizontal rods 44 and 45 respectively. These rods may turn in the bearing openings in the brackets and may also be adjusted endwise therein and I provide suitable set screws 46 for retaining them in adjusted position.

The forward ends of the rods 44 and 45 carry respectively the yokes 47 and 48 provided with adjusting screws for supporting bearings 49 and 50 respectively. These bearings support a rock shaft 51 which extends transversely across the forward end of the cushion or pillow 21. By adjustment of the rods 44 and 45 I may vary the position of the shaft 51 relative to the front edge of the cushion, so as to accommodate forms or lasts of different sizes or styles, and for the same reason I may adjust the shaft 51 vertically by means of the adjustable bearings 49 and 50.

The shaft 51 is provided with collars 52 to prevent it from moving endwise in its bearings and at its left-hand end this shaft projects substantially beyond the bearing 49 and carries a pulley 53. This pulley is fixed to the shaft and is provided with a groove for the reception of a helical coiled spring 54, one end of which is attached to the pulley and the other end of which is secured to a hook 55 or other suitable element fixed to the table. The arrangement of this spring upon the pulley is such that it tends to turn the shaft 51 in a clockwise direction, as viewed in Fig. 2.

The shaft 51 also carries a crank arm 56 which may conveniently be formed integrally with the pulley 53. This crank arm normally occupies the position indicated in Fig. 2 and is provided with an opening at its free end for the reception of one end of a cord, chain or other flexible actuating element 57. This chain or cord 57 passes down through an opening in the rear of the table, thence over suitable guides 58 and 58$^a$ (Fig. 3) and is attached at its lower end to a loop or hook 59, substantially midway of the length of a pedal lever 60. This lever is provided with a tread plate 61 at its forward end for engagement by the foot of the operator and is furnished with a sleeve 62 at its rear end which turns upon a pivot shaft 63 carried by brackets projecting up from the rear foot member 14. I provide a latch 66 carried by a bracket 67, which may be secured to the floor of the room in which the apparatus is located, and I so dispose this latch that when the pedal lever is depressed the latch will snap over the lever and hold the latter in its lowermost position until the latch is released by the foot of the operator. Since the specific details of this latch form no part of this invention, it is unnecessary to describe it further.

The rock shaft 51 is furnished with a socket opening 51$^a$ (Fig. 12) at a point in the shaft substantially opposite to the middle of the cushion or pillow 21. This socket opening 51$^a$ is preferably internally screw threaded and is adapted to receive any selected one of a series of last-supporting jacks. These jacks are intended to cooperate respectively with lasts of the various styles commonly employed, and to support this series of jacks I preferably provide a bracket 70 secured to the side wall member 17 of the table and furnish this bracket with a plurality of screw-threaded socket openings in which the reserve jacks 68$^a$ (Fig. 2) may be retained. If desired, reserve lasts, as indicated for example at 69$^a$ in Fig. 2, may be mounted upon these reserve jacks. In Fig. 3 the working last 69 is shown mounted upon the jack 68 carried by the shaft 51, and as above suggested this last and jack may be replaced by others whenever desired.

I attach a hollow housing or casing 71 (Fig. 2) to the rear wall 16 of the table. This housing or casing is closed at all sides except its front, but at its front is provided with an opening 72 just above the upper edge of the back member 16 of the table. Preferably I provide an upwardly opening hinged door 73 for closing the upper portion of this opening, and furnish a handle lever 72$^b$ for opening the door when desired. A flat friction spring 72$^c$ (Fig. 1) retains the door in open position when desired.

Figure 6:
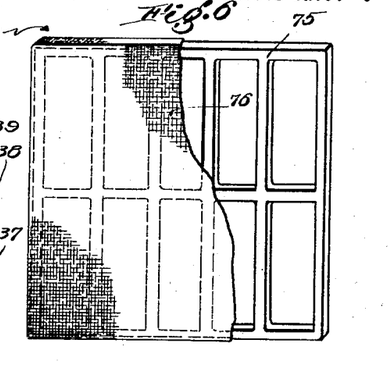
Fig. 6 is a perspective view, partly broken away, showing one of the blank supporting shelves used in the blank steaming chamber.

In the mid portion of this casing 71 I provide its side walls with ledges or grooves adapted to support a series of superposed shelves 74. As shown in Fig. 6 these shelves preferably consist of open-work frames 75 of suitable stiff material adapted to support the weight of the blanks which are placed thereon. Preferably these frames or skeletons are of grid-like construction and I enclose the frame or skeleton of the shelf in a bag or slip 76 formed of absorbent and pervious textile fabric. Under some circumstances I may omit this fabric altogether, or I may in some cases prefer to substitute material other than textile material, for example, asbestos fiber or the like. The several shelves 74 are spaced apart a distance at least great enough to receive between adjacent shelves one of the forepart blanks, but preferably the shelves are not spaced much more than the thickness of a blank since I prefer to have the blank in substantial contact upon both faces with the absorbent covering of adjacent shelves.

A stand pipe 77 extends up into the lower part of the casing 71 so as to maintain a water level in this casing at a point just below the lowermost of the shelves. The stand pipe 77 is connected by a suitable pipe 77$^a$ to the hollow warming shelf 33 so that the warm water overflowing into the stand pipe 77 is delivered into the chamber 34 in the warming shelf. A pipe 78 supplies steam to the interior of the casing 71. This pipe 78 is furnished with a control valve 79 (Figs. 1 and 13) by means of which the amount of steam delivered to the casing 71 may be regulated.

Preferably I mount a hood 80 above the cushion or pillow 21. As a convenient way of supporting this hood I furnish its lower edges with flanges 81 and 82 respectively, adapted to rest upon the upper edges of the guard walls 18 and 20. A pipe 83 extends from the top of the hood to a suitable exhaust apparatus, not shown, and by this means fumes and vapor evolved during the molding operation are carried away from the vicinity of the workmen.

The hood 80 provides a convenient support for shelves 84 and 84$^a$ adapted to support reserve supplies 85 and 85$^a$ of cross bar blanks. The blanks of the piles 85 and 85$^a$ may be lefts and rights, respectively, which are thus kept separate and in convenient position to be picked up by the operator. When supported in this position the reserve cross bar blanks are kept warm so that they are somewhat pliable prior to the molding operation. If desired I may mount upon the outside of the hood a tool box 86 which forms a convenient receptacle for such small tools, for example, knives, tack hammers, etc., as may be required for the workmen.

Figure 9:
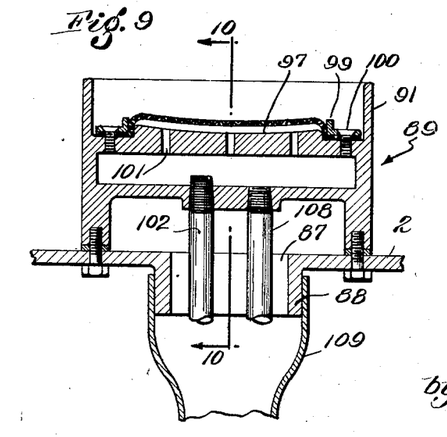
Fig. 9 is a vertical section substantially on the line 9—9 of Fig. 10, showing details of a cross bar heating and molding device.
Figure 10:
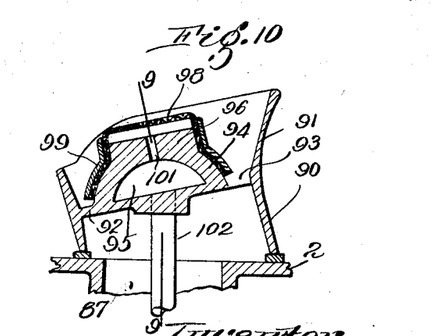
Fig. 10 is a vertical section on the line 10—10 of Fig. 9.

The left-hand wing 2 of the table is provided with an opening 87 (Figs. 9 and 10) surrounded by the downwardly directed flange or nipple 88. Above this opening I mount the cross bar heater 89. This heater is provided with a base 90 which is securely attached to the wing 2 of the table by means of bolts or otherwise, preferably with interposition of packing material between it and the table. This base carries an open-topped elongate trough-like receptacle or casing 91 and for convenience the base is so shaped that the plane of the top of this receptacle 91 is inclined to the top of the table and forwardly toward the position of the workman. The receptacle 91 is furnished with a transverse web 92 extending from opening 93 at its rear side between it and the wall of the receptacle. This web 92 carries a hollow support 94 having an internal chamber 95 and a top wall 96 downwardly concave in a transverse direction as indicated at 97. Across this upper surface 97 of the support I arrange a pad 98, preferably of textile fabric and preferably consisting of several superposed layers of such fabric. This pad of fabric is clamped in position by means of a frame 99 which engages the edges of the pad and which is secured to the support by means of screws 100. The upper wall 96 of the support is furnished with one or more passages or openings 101 connecting the chamber 95 with the space immediately below the textile pad 97.

A steam supply pipe 102 extends up through the opening 87 and passes through the lower wall of the support 94 to supply steam to the chamber 95. The pipe 102 is connected to a valve 103 (Fig. 2) having a controlling handle 104 (Figs. 1 and 2) within convenient reach of the operator. The inlet end of this valve 103 is connected by a pipe 105 to a T-connection 106 to which the main steam supply pipe 107 is connected. This steam supply pipe may be provided, if desired, with a controlling valve V (Fig. 2) for shutting off the steam completely from the machine when not in use and this supply pipe 107 is normally furnished with low pressure steam from any suitable source.

An exhaust pipe 108 leads from the chamber 95 in the cross bar heater and extends substantially parallel with the pipe 105 and thence upwardly at the rear of the machine and is connected to the controlling valve 79. Thus the steam exhausted from the cross bar heater passes through the pipe 108, through valve 79 and the pipe 78, to the steaming chamber within the casing 71. The overflow water (condensed steam) from this chamber, as above described, passes directly into the warming shelf 33 from which the overflow is carried away by the pipe 38.

An exhaust pipe 109 is connected to the nipple 88 surrounding the opening 87 above described, and this pipe 109 is connected to the pipe 83 at any suitable point, not shown. Thus any steam or vapor rising from the pad 98 is sucked down through the opening 93 in the casing 91 and away from the vicinity of the operator.

Referring to Fig. 13, the T-connection 106 is connected by a pipe 110 to a valve casing 111. This valve casing is provided with a rotary valve having an actuating handle or lever 112 (Figs. 2 and 13); a spring 113 (Fig. 2) is connected to this lever, the other end of the spring being attached to the back wall 16 of the table. The tendency of the spring 113 is to close this valve. A link 114 is connected to the valve lever 112 and extends downwardly below the table and is secured at its lower end to a bracket 115 projecting from the pedal lever 60. Preferably the link 114 is adjustable in length by means of a turnbuckle 116. The weight of the pedal lever 60 is supported by means of a spring 117, thus relieving the valve spring 113 of this duty.

From the delivery end of the valve casing 111 a pipe 119 extends to a T-connection 120 from which the pipe 28 leads to the pillow or cushion.

A pipe 121 (Fig. 13) extends upwardly from the connection 106 and leads to a valve 122 having a controlling handle 123. From this valve the pipe 124 leads to the connection 120. The valve 122 is normally adjusted to permit but a small flow of steam, and as the pipe 121 is at all times connected with the supply 107, a small amount of steam constantly enters the cushion of the pillow, but this quantity is not sufficient to inflate the pillow but merely to keep it near the working temperature.

As some operators prefer to use the cushion or pillow 21 for molding the cross bars instead of the heater 89, I provide a by-pass pipe 121ª leading directly from the pipe 121 to the pipe 108 (Fig. 13) so that steam may be delivered directly to the casing 71 without passing through the heater 89. A valve 121ᵇ controls the flow of steam through the pipe 121.ª

Figure 7:
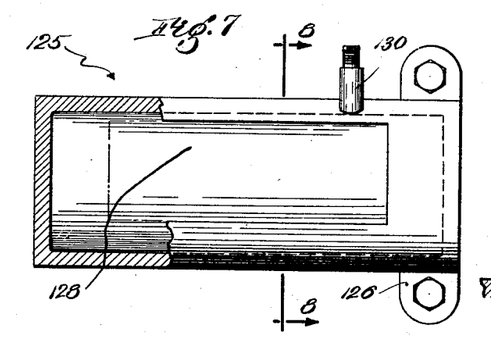
Fig. 7 is a plan view, partly in horizontal section, illustrating a cooling device employed for setting the cross bars of the last after they have been molded and fixed in position.
Figure 8:
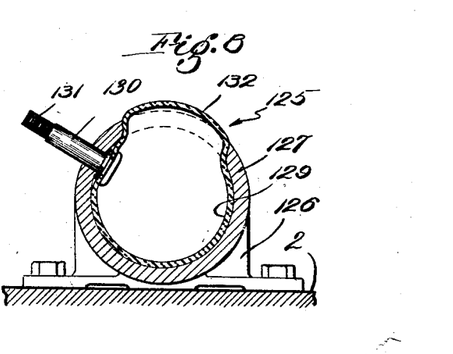
Fig. 8 is a vertical section substantially on the line 8—8 of Fig. 7.

Upon the left-hand wing 2 of the table I mount a cross bar cooler 125 (Figs. 7 and 8). This cooler comprises a base 126 which is secured to the wing 2 by bolts or in any other suitable manner and a tubular substantially cylindrical shell 127 provided with an elongate slot or opening 128 in the upper part of its cylindrical wall. An air-tight bag 129, preferably of rubber, is disposed within the shell 127 and this bag is furnished with a nipple 130 passing out through a suitable opening in the shell and having a screw-threaded end 131 for attachment to an air pump or other suitable supply of compressed air or gas. When the tube 129 is fully inflated, a portion of it protrudes through the slot 128, as indicated at 132 (Fig. 8), thus presenting a convex yielding surface against which the cross bar may be pressed for cooling it after it is molded in position.

Since the bag is encased except at the opening 128 it is protected from injury by the pins provided at the shank portion of the molding last for retaining the side portion of the forepart blank in position.

I mount a bracket 133 (Figs. 1 and 4) upon the guard wall 20 or other convenient part of the frame and furnish this bracket with an elongate slot 134 for the reception of a pivot stud 135 projecting down from a boss 136 upon the base of a shallow holder or receptacle 137. This holder is adapted to receive a removable reservoir 138 having a cover 139 provided with a slot 140 through which projects a fluid-applying disk 141. This reservoir with its disk is more fully described in my copending application, Serial No. 109,478, filed May 17, 1926, and forms no essential part of the present invention. It is to be noted, however, that the support 137 herein provided may be swung about a vertical axis by loosening the nut 135$^a$ upon the stud 135 so that the plane in which the wheel or disk 141 turns may be varied to suit the convenience of the operator. Likewise the support 137 may be moved longitudinally of the bracket 133 for the same purpose, and the receptacle may readily be removed from the holder for cleaning or filling.

A forepart cooling device 142 (Fig. 11) is mounted upon the right-hand wing 3 of the table. This cooling device preferably comprises a trough-like casing having side walls 143 and a curved rear wall 144. This casing has a cross bar 145 near its rear end and also a cross bar 146 at its forward end, the latter preferably being removable. An inflatable air-tight bag 147 is disposed within this receptacle and is clamped beneath the cross bar 146 at a point near its forward end. This bag 147 is furnished with a nipple 148 projecting through a hole in the receptacle and by means of which the bag may be inflated, it being understood that this nipple 148 as well as the nipple 130 of the bag 129, previously described, is furnished with a valve of the type usually employed in a pneumatic tire to prevent escape of the air.

Figure 1:
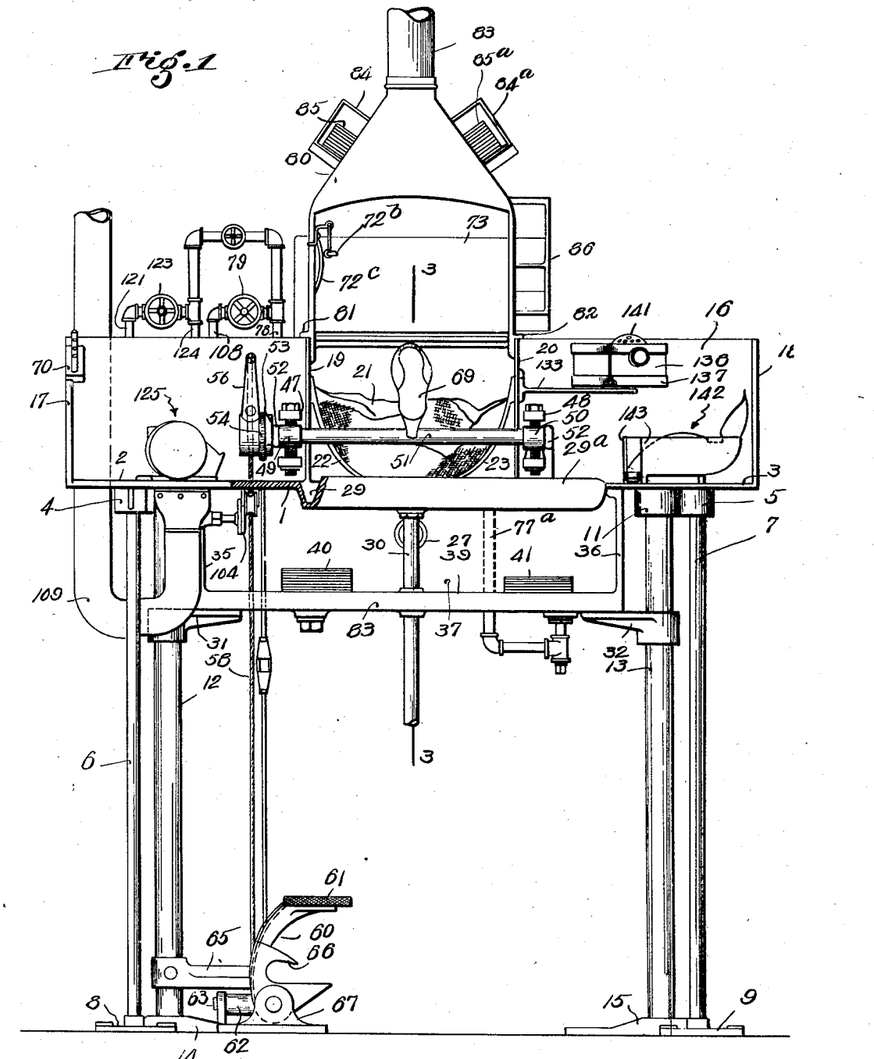
Fig. 1 is a front elevation, with certain parts shown in section, illustrating the complete machine with its parts in normal position.

The operation of the device is substantially as follows, it being understood that the parts, when not in use, occupy the positions shown in Fig. 1. Before starting the machine the operator turns on the steam and places piles of blanks at the positions indicated at 40 and 41 and 85 and 85$^a$ respectively. When these blanks have become suitably warm and the working parts of the machine have been warmed up nearly to operating temperature, the operator takes blanks from the piles 40 and 41 and lays them between the shelves 74 in the steaming chamber. The blanks are allowed to remain in this chamber for a few minutes until they have become quite pliable. The operator then quickly withdraws one of these blanks from the steaming chamber and lays it upon the cushion 21, it being understood that he has already placed a last 69 upon the spindle or jack 68 carried by the shaft 51. The operator now depresses the pedal 61 until the pedal lever is engaged by the latch 66 and held locked in its downward position; as the lever is depressed the link 114 actuates the valve in casing 111 and admits a full supply of steam to the interior of the cushion 21, quickly inflating the latter and raising it to the full working temperature. Simultaneously with this full inflation of the bag, the last 60 is pressed downwardly against the forepart blank resting upon the cushion, thus causing the blank to conform to the curved surface of the last. The operator now takes the side portions of the blank and draws them up over the bottom of the last, securing them to the bottom of the last by means of tacks or by the use of pins fixed for this purpose in the bottom of the last. When the side portions of the blank have thus been secured in position, the operator releases the latch 66, permitting the spring 54 to return the shaft 51 with the jack and last to normal position, at the same time cutting down the steam supply to the cushion. The operator now removes the last from the jack and with his hand quickly wipes in the soft edge portion of the blank over the bottom of the last at the toe portion, and he then presses the inturned edge of the material at the toe portion down upon the cool cushion 142 so as to cause the edge of the blank to lie smoothly against the under surface of the last at the toe portion of the latter. As the cushion 142 is cool, the blank rapidly cools while pressed against this cushion, so that it retains the flat shape imparted thereto by this pressure.

The operator now applies the usual two-ply cross bar or cross bars to the form upon the last and for this purpose removes the appropriate cross bar from one or the other of the boxes 84 or 84$^a$; and after separating its plies $a$ and $b$ at its opposite ends, an operation which is facilitated by the cut-away corner $c$, as shown in Fig. 14, he moistens the inner faces of the plies by the use of the wheel 141, and then applies the opposite ends of the cross bar to the inturned flange-like edge portions of the molded form so that the cross bar extends across the ball portion of the last, uniting the edges of the molded form. In order to cause the cross bar to fit the bottom of the last snugly and also to cause it to adhere properly to the flange portions of the hollow form, the operator presses the last 69 with the hollow form thereon bottom down against the steam heated pad 98, celluloid or other sheet material of which the form is made.

After the completed form has been withdrawn from the last the operator again withdraws a forepart blank from one of the shelves 74 and places it upon the cushion 21 ready for the next operation. Preferably each time that a blank is withdrawn from one of the shelves 74, a corresponding blank is removed from one of the piles 40 or 41 and placed between the shelves 74 so that a blank may always be in proper condition ready for the molding operation. In the same way as blanks are removed from the piles 40 and 41, other blanks are supplied from time to time so that preheated blanks may always be available for placing upon the shelves 74. Likewise, the supply of cross bars is also replenished as the work proceeds.

As already pointed out, the exhaust steam from the cross bar heater 89 is delivered to the steaming chamber 71 where it is available for heating the forepart forms, and from this chamber 71 the hot condensate is led to the warming shelf 33 where its remaining heat is available for preheating the blanks piled upon this shelf. The heat supply is thus used in the most economical manner, reducing the cost of production and at the same time avoiding the overheating of the workroom. By the provision of the guard walls 19 and 20 and the back wall 16 partially enclosing the cushion or pillow 21, the molding operation is carried out in an atmosphere of substantially uniform and unvarying temperature and moisture content so that very certain and uniform results are obtainable. With the arrangement disclosed, all of the several instrumentalities employed in making the form are grouped in the most convenient way with reference to the position of the operator, and the several appliances to which heat is supplied are furnished with controlling valves by means of which the operator may regulate the temperature with great accuracy so that under all conditions good results may be obtained. Moreover, by arranging the parts in the relative positions herein disclosed the operator, even though relatively unskilled, is able to produce good results at high speed, and by the control of the steam supply for the cushion as herein illustrated, a much smaller quantity of steam is used than if the cushion were constantly fully inflated, while at the same time the operator may work in a cool atmosphere substantially free from vapor.

While I have herein disclosed one desirable embodiment of my invention, I wish it to be understood that this is merely by way of example and that various changes in relative position and proportion of parts as well as in the materials employed may be made without departing from the spirit of the invention.

I claim:

1. That process of molding hollow shoe forms or lasts from normally stiff sheet material which comprises as steps subjecting a piece of the sheet material to the action of a medium adapted to soften and increase the pliability of such sheet while concomitantly molding a blank previously treated to make it pliable, transferring the first-named blank to a molding position while continuing to subject it to the action of the softening medium, further increasing the pliability of the blank, and molding the blank about a shoe last by pressure including manual manipulation.

2. That process of molding hollow shoe forms from normally stiff sheet material which comprises as steps subjecting a piece of the sheet material to the action of heat to make it pliable while concomitantly molding another piece of the material previously treated to make it pliable, transferring said first piece to molding position while constantly maintaining it at a high temperature, and drawing the blank while warm and soft about a shoe last.

3. That process of molding hollow shoe forms from normally stiff sheet material which comprises as steps subjecting a piece of the material to the combined action of heat and moisture whereby to soften it and make it pliable, molding a previously softened piece of the material while softening the first-named piece, transferring said first-named piece to a molding position while maintaining it in a hot and moist atmosphere, and comforming said piece to the outer surface of a shoe last while softening another piece.

4. That process of molding hollow forms or lasts from sheet celluloid which comprises as steps cutting a blank from the sheet celluloid, subjecting said blank to the action of warm substantially dry air, replacing said blank by a second blank and subjecting the first blank to a hot, moist atmosphere whereby to make it pliable, transferring the softened blank while protecting it from cold air to a molding position and conforming it while soft to the outer surface of a shoe last, and transferring the second blank to the hot moist atmosphere while subjecting a third blank to the warm dry atmosphere.

5. That process of molding hollow shoe forms from sheet celluloid which comprises as steps softening a blank of sheet celluloid by placing it within a chamber containing steam, removing the softened blank from said chamber and while still maintaining it in a hot moist atmosphere, molding it to desired shape.

6. That process of molding hollow forms from normally stiff sheet celluloid which comprises as steps placing a blank of the material in a chamber containing hot vapor whereby to heat the blank and soften it, removing the blank from the chamber and while keeping it hot placing it upon a heated cushion, and pressing a shoe last upon the blank while resting upon the cushion whereby to conform the blank to the surface of the last.

7. That process of molding hollow forms from sheet celluloid which comprises as steps softening a blank of sheet celluloid to make it pliable, laying the blank while still soft upon a yielding cushion, and pressing a last upon the softened blank whereby to conform the blank to the shape of the last.

8. That process of molding hollow lasts from sheet celluloid which comprises as steps softening a blank of sheet celluloid to make it pliable, laying the previously softened blank upon a yielding cushion, and while maintaining the pliability of the blank, pressing a shoe last down upon it and drawing the edges of the blank over the bottom of the last whereby to conform the blank to the surface of the last.

9. That process of molding hollow shoe forms or lasts from sheet celluloid which comprises as steps softening a sheet celluloid blank by the action of heat whereby to make it pliable, and while keeping it in a hot atmosphere laying the blank upon a heated and yielding cushion, and pressing a shoe last upon the yieldingly supported blank whereby to conform the blank to the surface of the last.

10. That process of molding hollow forms or lasts from sheet celluloid which comprises as steps subjecting a sheet celluloid blank to the action of heat and moisture to soften it, and while maintaining it in a hot and moist atmosphere laying the softened blank against a pervious steam filled cushion, and pressing a shoe last against the blank whereby to conform the blank to the shape of the last.

11. Apparatus for molding normally stiff sheet material comprising a hollow housing, a pervious moisture absorbent shelf within the housing for supporting a blank to be molded, and means for supplying steam to the housing.

12. Apparatus for molding normally stiff sheet material comprising a hollow housing, a plurality of superposed moisture absorbent shelves within the housing for supporting blanks to be molded, and means for supplying steam to the housing, the shelves being so spaced that a blank of the material to be molded contacts with each of two shelves between which it is placed.

13. Apparatus for molding normally stiff sheet material, comprising a hollow housing, a shelf within the housing for supporting a blank, said shelf having a stiff perforated frame and a covering of moisture absorbent material, and means for supplying steam to the housing.

14. Apparatus for molding normally stiff sheet material, comprising a hollow housing, a plurality of superposed shelves within the housing for supporting blanks to be molded, each shelf consisting of a grid-like frame and an enveloping jacket of textile fabric, and means for supplying steam to the housing.

15. In apparatus for molding normally stiff sheet material, a hollow warming table for supporting blanks to be molded, a housing providing a steaming chamber for blanks, means for admitting steam to said chamber, and means for conducting steam condensed in said chamber to the interior of the warming table.

16. In apparatus for molding normally stiff sheet material, a hollow warming table for supporting blanks to be molded, a housing providing a steaming chamber for blanks, said chamber having a water reservoir in its lower part, means for admitting steam to said chamber, the condensed steam collecting in said reservoir, and means for conducting overflow water from said reservoir to the interior of the hollow table.

17. In apparatus for molding normally stiff sheet material, a hollow warming table for supporting blanks to be molded, a housing providing a steaming chamber for blanks, said chamber having a water reservoir in its lower part, means determining the water level in said reservoir, means supplying steam for the chamber, the condensed steam collecting in the reservoir, a pipe for conducting the overflow water from the reservoir to the interior of said hollow table, and means determining the water level in the latter.

18. Apparatus for molding normally stiff sheet material by the combined use of heat and moisture comprising molding means, means for supplying steam to the molding means, a support for a blank to be molded, and means for collecting steam condensed in the vicinity of the molding means and conducting the hot condensate to the support for heating the latter.

19. Apparatus for molding normally stiff sheet material by the combined use of heat and moisture comprising molding means, including a yielding cushion, a hood overhanging the cushion, and a heating chamber opening into the hood at the rear of and above the cushion.

20. Apparatus for molding normally stiff sheet material by the combined use of heat and moisture comprising molding means, including a yielding cushion, a housing at the rear of the cushion, said housing having a chamber for the reception of blanks to be molded, the front wall of the chamber having an opening at a point above the cushion, means for supplying steam to said chamber, and a hood overhanging the cushion and the opening in the front wall of the chamber.

21. Apparatus for molding normally stiff sheet material by the combined use of heat and moisture comprising molding means, including a yielding cushion to support the material while being molded, and means partially surrounding the cushion whereby to maintain a warm atmosphere about the cushion during the molding operation.

22. Apparatus for molding normally stiff sheet material by the combined use of heat and moisture comprising molding means including a yielding cushion to support the material while being molded, a chamber in which the material is softened prior to molding, and means for shielding the blank while being transferred from the softening chamber to the cushion.

23. Apparatus for molding normally stiff sheet material by the combined use of heat and moisture comprising molding means, including a yielding cushion, means for heating the cushion, and means overhanging the cushion providing a heat retaining chamber open at its front to permit manipulation of the material by the hand of the operator during molding, and means for conducting away fumes and vapor evolved during the molding operation.

24. Apparatus for use in making hollow shoe forms from sheet celluloid comprising molding means including a pervious cushion, a housing providing a chamber for the reception of blanks to be molded, said chamber having an opening in its wall, a hood overhanging the cushion and said opening in the wall of the chamber, a door for the opening, and means for supplying steam to the chamber and to the interior of the cushion.

25. Apparatus for use in making hollow shoe forms from sheet celluloid comprising molding means including a pervious cushion, a concave cradle underlying and supporting the cushion, and means for supplying steam to the interior of the cushion to inflate it.

26. Apparatus for use in making hollow shoe forms from sheet celluloid comprising molding means including a substantially rectangular pillow-like cushion of pervious material, a substantially semi-cylindrical rigid cradle supporting the cushion, and means for delivering steam to the interior of the cushion at its lowest point to inflate it.

27. Apparatus for use in making hollow shoe forms from sheet material comprising an inflatable cushion for supporting a blank while being molded, an oscillatory last support, means for rocking the last support whereby to press a last carried thereby into contact with a blank resting on the cushion, and means operating simultaneously with said movement of the last support for admitting steam to the interior of the cushion.

28. Apparatus for use in making hollow shoe forms from sheet material comprising an inflatable cushion for supporting a blank while being molded, means for moving a last forcibly against a blank resting on the cushion, and means moving concomitantly with the movement of the last toward the cushion for admitting pressure fluid to the cushion.

29. Apparatus for use in making hollow shoe forms from sheet material comprising an inflatable cushion for supporting a blank while being molded, means actuable by the operator for moving a last forcibly against a blank resting on the cushion, a valve controlling the admission of steam to the cushion, and means for opening said valve to admit steam to the cushion at each movement of the last toward the cushion and for closing said valve as the last recedes from the cushion.

30. Apparatus for use in making hollow shoe forms or lasts from sheet material comprising an inflatable cushion for supporting a blank while being molded, a last support movable toward and from the cushion, a pedal for moving the last support toward the cushion, and means actuable by the pedal as the last support moves toward the cushion for admitting steam to the interior of the cushion.

31. Apparatus for use in making hollow forms or lasts from sheet material comprising an inflatable cushion for supporting a blank while being molded, a rock shaft provided with a last support, means normally holding said shaft in inoperative position, a pedal, connections between the pedal and shaft for rocking the latter to carry the last support toward the cushion, a normally closed valve for controlling the admission of steam to the interior of the cushion, and means actuable by the pedal for opening said valve as the last support approaches the cushion.

32. Apparatus for use in making hollow shoe forms or lasts from sheet material comprising an inflatable cushion for supporting a blank while being molded, a horizontal rock shaft extending across the front of the cushion, a last supporting jack carried by the shaft, a spring tending to retain the shaft in inoperative position with the last jack remote from the cushion, a crank arm fixed to the shaft, a pedal lever, connection between the pedal lever and said crank arm for rocking the shaft when the pedal is depressed to swing the last supporting jack toward the cushion, and means actuable by the pedal for controlling the admission of steam to the cushion.

33. Apparatus for use in making hollow shoe forms or lasts from sheet material comprising an inflatable cushion for supporting a blank while being molded, a rock shaft disposed transversely across the front of the cushion, adjustable bearings for the rock shaft permitting it to be moved bodily toward or from the cushion, a last supporting jack carried by the shaft, and means for rocking the shaft to carry the jack toward or from the cushion.

34. Apparatus for use in making hollow shoe forms or lasts from sheet material comprising an inflatable cushion for supporting a blank while being molded, a last supporting jack, means for moving the jack toward and from the cushion, and means for varying the position of the path of movement of the jack to accommodate different lasts.

35. Apparatus for use in making hollow forms or lasts from sheet material comprising an inflatable cushion for supporting a blank while being molded, a rock shaft, a last supporting jack carried by the rock shaft, independently adjustable bearings for the opposite ends of the shaft, said bearings being adjustable vertically and from front to rear, and means for rocking the shaft.

36. Apparatus for use in making hollow forms or lasts from sheet material comprising an inflatable cushion for supporting a blank while being molded, a movable support for a last jack, said support having a screw-threaded socket for the reception of interchangeable jacks of different styles, and means for moving said support to carry a jack seated in the socket toward and from the cushion.

37. Apparatus for use in making hollow shoe forms from sheet material comprising an inflatable cushion for supporting a blank while being molded, a rock shaft disposed transversely of the cushion, said shaft having a socket opening therein, a rack for holding a plurality of interchangeable last jacks, each jack having a base portion shaped to fit in the socket in the shaft, and means for rocking the shaft to cause a jack seated in said socket to move toward or from the cushion.

38. Apparatus for molding hollow shoe forms or lasts from sheet celluloid comprising an inflatable cushion, a valve for controlling the admission of steam to the cushion, and means which opens said valve during each molding operation and which closes it in the intervals between such operations.

39. Apparatus for molding hollow shoe forms or lasts from sheet celluloid comprising a hollow cushion, means normally admitting a small and substantially constant supply of steam to the cushion, and means for intermittently admitting a larger supply of steam to the cushion.

40. Apparatus for molding hollow shoe forms or lasts from sheet celluloid comprising an inflatable cushion of pervious material, means comprising an adjustable valve for bleeding a small quantity of steam into the cushion to keep the cushion warm, and means operative intermittently for admitting a larger quantity of steam to the cushion to inflate it.

41. In apparatus for molding a hollow shoe form or last comprising a forepart member and a cross bar, said apparatus having a heating chamber for softening the forepart member of the last prior to molding, a steam heated pad for molding the cross bar to shape, and means for conducting exhaust steam from the cross bar molding pad to the heating chamber.

42. Apparatus of the class described comprising a pervious inflatable pad for molding one part of a hollow sheet celluloid shoe form, a pervious cushion for molding another part of said form, means for supplying steam to both pad and cushion, means for conveying away fumes and vapor issuing from both pad and cushion, and means for conveying away condensed steam from the vicinity of the pad and cushion.

43. Apparatus of the class described comprising means for use in molding the forepart member of a hollow shoe form or last, means for maintaining a heated atmosphere about the molding means while exposing the latter to permit manipulation of the material during molding by the hand of the operator, and a resilient air-filled cushion adjacent to the molding means for cooling the hollow form or last after molding.

44. In apparatus of the class described having a table having a centrally disposed inflatable cushion for use in molding the forepart member of a hollow celluloid form or last, a guard wall disposed at either side of the cushion, a hood supported upon the upper edges of the guard walls, means carried by the hood for holding a supply of cross bar members prior to application of such cross bar members to the hollow form, and means for supplying steam to the cushion for inflating the latter, the heat rising from the cushion warming the hood and the cross bar holding means.

45. In apparatus of the class described having a table provided with a centrally disposed inflatable cushion for use in molding the forepart member of a hollow celluloid shoe form or last, a guard wall disposed at either side of the cushion, a hood supported upon the upper edges of the guard walls, a hollow warming shelf below the table for supporting a supply of forepart blanks, means for supplying steam to the interior of the cushion, and means for conducting condensed steam escaping from the cushion to said warming shelf.

46. In apparatus of the class described having means for use in molding the forepart member of a hollow celluloid form or last by the use of heat, a guard wall disposed at either side of the molding means, a hood supported upon the upper edges of the guard walls, independent means carried by the hood for supporting supplies of left and right cross bar blanks, respectively, and means below the molding means for supporting and warming a supply of forepart blanks.

47. In apparatus of the class described comprising means for supporting and warming a supply of cross bar blanks, and means for applying fluid to the ends of the cross bar blanks, said fluid applying means being adjustably supported to permit it to be moved laterally with respect to the forepart forming means.

48. In apparatus of the class described having means for use in molding the forepart member of a hollow celluloid shoe form or last, means for supporting a supply of cross bar blanks, a shelf, a reservoir holder carried by the shelf, the holder being adjustable about a vertical axis, and a reservoir carried by the holder for supplying attaching fluid to the ends of the cross bar blanks.

49. Apparatus of the class described comprising a U-shaped table having a central or rear portion and forwardly directed wings, a concave cradle disposed at the central portion of the table, a pillow of textile material disposed within said cradle, means for supplying steam to inflate the pillow, a guard wall at each side of and at the back of the pillow, a hollow housing secured to said back wall, said housing having a chamber provided with an opening just above said back wall, moisture absorbent shelves in said chambers, means for supplying steam to the chamber, and a hood above the pillow.

50. In apparatus of the class described for use in making hollow shoe forms from sheet celluloid by the use of heat, a cooling device comprising a substantially horizontal cylindrical casing having an opening in its peripheral wall, an elastic air-tight bag within the casing, and means for admitting air under pressure to the bag to inflate the bag and thereby cause a portion thereof to protrude through the opening in the casing.

51. In apparatus for use in molding hollow shoe forms from sheet celluloid by the use of heat, means for cooling a part of the form after molding comprising a cylindrical shell having means for securing it in horizontal position, said shell having an elongate axially extending slot in the upper portion of its cylindrical wall, and an inflatable rubber bag within the shell having a portion exposed through said opening.

52. In apparatus for use in molding hollow shoe forms from sheet celluloid by the use of heat and having a table, an inflatable cushion carried by the table, means for admitting steam to the cushion to inflate it, and means for moving a shoe last toward the cushion to conform a forepart blank resting on the cushion to the shape of the former last, means for cooling the molded blank, said cooling means comprising an elongate rubber bag inflated with air and presenting a broad upwardly convex surface.

53. That process of molding hollow shoe forms or lasts from blanks of normally stiff sheet material which comprises as steps subjecting the blank to the action of a medium adapted to soften and increase the pliability of the blank, transferring the treated blank and further subjecting it to the action of the medium, moving the blank to the molding position while continuing to subject it to the action of the medium, there increasing its pliability and molding it about a shoe last.

54. That process of molding hollow shoe forms or lasts from blanks of normally stiff sheet material which comprises as steps subjecting the blank to the action of a medium adapted to soften and increase the pliability of the blank, transferring the treated blank to the molding position while continuing to subject it to the action of the medium, further increasing its pliability, and thereupon molding the blank about a shoe last.

55. That process of molding hollow shoe forms or lasts from blanks of normally stiff sheet material which comprises as steps subjecting the blank to the action of a medium adapted to soften and increase the pliability of the blank, transferring the treated blank to the molding position while retaining it in the condition to which it was brought by the medium, molding the blank against a shoe last by a combination of pressure and manual manipulation and subjecting the blank to heat during such manipulation.

56. That process of molding hollow shoe forms or lasts from blanks of normally stiff sheet material which comprises as steps preliminarily shaping the blank over a last, pressing the fore part of the blank between the last and a yielding surface, subjecting the blank to heat and moisture and, while the blank is so pressed and subjected, drawing the side portions of the blank over said last and securing them temporarily thereto.

57. That process of molding hollow shoe forms or lasts from blanks of normally stiff sheet material which comprises as steps preliminarily shaping the blank over a last, pressing the fore part of the blank between the last and a yielding surface, whereby the forward edge of the blank is bent over onto the sole of the last, subjecting the blank to heat and moisture and, while the blank is so pressed and subjected, drawing the side portions of the blank over onto the sole of the last.

58. That process of molding hollow shoe forms or lasts from blanks of normally stiff sheet material which comprises as steps preliminarily shaping the blank over a last, pressing the fore part of the blank between the last and a yielding surface, whereby the forward edge of the blank is bent over onto the sole of the last and subjecting the blank so positioned to heat and moisture.

Signed by me at Auburn, New York, this first day of February, 1927.

WILLIAM J. DE WITT.